United States Patent [19]

Wegner

[11] Patent Number: 4,885,007

[45] Date of Patent: Dec. 5, 1989

[54] DIP PROCESS FOR ENVELOPING A BATTERY PLATE

[75] Inventor: Paul C. Wegner, San Carlos, Calif.

[73] Assignee: Tiegel Manufacturing, Belmont, Calif.

[21] Appl. No.: 226,457

[22] Filed: Aug. 1, 1988

[51] Int. Cl.$^4$ .............................................. H07M 2/18
[52] U.S. Cl. ................................... 29/623.5; 429/137
[58] Field of Search ........................ 429/137; 29/623.5

[56] References Cited

U.S. PATENT DOCUMENTS

| | | | |
|---|---|---|---|
| 3,023,261 | 2/1962 | Louis et al. | 429/137 |
| 4,524,509 | 6/1985 | Wegner | 29/623.5 |
| 4,551,401 | 11/1985 | Wilson | 429/137 X |

Primary Examiner—Stephen J. Kalafut

Attorney, Agent, or Firm—Benasutti Law Offices

[57] ABSTRACT

An improved dip method of enveloping a battery plate with a microporous separator material. The method involves first removing air bubbles and residual water from the plate by dipping the plate in an anhydrous liquid such as anhydrous solvent or anhydrous solvent-/nonsolvent solution, then dipping the plate in a second liquid comprising a polymer-solvent-filler or polymer-solvent/nonsolvent-filler suspension. After removal from the second liquid, the plate is dried by evaporation. The result is the formation of a microporous separator envelope about the battery plate. The plate may be dipped in a third liquid before drying. The third liquid may have a viscosity greater than that of the second liquid.

18 Claims, 4 Drawing Sheets

DIP PROCESS FOR ENVELOPING A BATTERY PLATE

BACKGROUND OF THE INVENTION

1. Field of the Invention

This invention relates to battery separators, and in particular relates to an improved dip process for forming a microporous separator envelope about a battery plate, such that the envelope functions as a battery separator for use in lead-acid batteries of the type, for example, used in automobiles.

2. Description of the Prior Art

In the prior art, it has been thought desirable to form a battery separator directly on a battery plate by a method of dipping the plate in one or more solutions. While many prior art patents speak of such a process, in fact few have achieved any commercial success.

To prevent the positive and negatively charged plates or electrodes of lead-acid batteries from coming into contact with each other, thereby self discharging the battery plate, sheets of separator material are positioned between the positive and negative battery plates. This separator material is usually comprised of preformed separator sheets which must be positioned either mechanically or manually between the positive and negative electrodes or sealed on three sides about one of the plate types, thereby enveloping it. In today's world of high speed mass production, these techniques are slow, labor intensive and most importantly generate large scrap rate losses when automated, and are inefficient processes for the manufacturer of batteries.

The present invention overcomes the necessity of enveloping the battery plates with separator material by mechanical process or positioning separator material between the plates. A separator envelope is produced by an improved dip process.

Prior patents have proposed methods of dipping or applying a coating on a battery plate. See the discussion in my prior U.S. Pat. No. 4,524,509 incorporated herein by reference. As discussed in detail in my prior U.S. Pat. No. 4,524,509, prior, proposed methods of producing a battery separator by dipping failed to produce a commercially acceptable battery separator material. In my prior U.S. Pat. No. 4,524,509, disclosed a method of enveloping a battery plate by a dip process which involved first removing air bubbles from the battery plate by dipping the plate in the first liquid, then dipping the plate into a polymer-solvent-filler suspension. After removal from the polymer-solvent-filler suspension, the plate was dried by evaporation or contacted with a nonsolvent and then dried. The result was the formation of a commercially acceptable microporous separator envelope about the battery plate.

SUMMARY OF THE INVENTION

It is a primary objective of the present invention to provide an improved high-speed process for enveloping a battery plate with microporous separator material.

The separator enveloping material must be porous, and inert to the environment of a lead-acid battery especially, it should be inert to the strong oxidizing of the positive plate. It should be wettable, free of commercially objectionable pin holes, conductive to ionic flow, tough and elastic to accommodate plate growth and firmly adhere to the battery plate. It is a further object of the present invention to provide such a material by dipping a battery plate in a solution and removing into an environment in which evaporation completes the improved process of enveloping a battery plate. A still further object of the present invention, is to complete the improved process with non-toxic materials.

In light of the disadvantages of the previous methods for providing separators and to fulfill the stated objectives, the present invention provides an improved high speed dip process for the enveloping of battery plates in a microporous separator material.

I have discovered that the desirable objectives mentioned above can be achieved by the following method and the use of the following materials. A battery plate to be provided with a separator envelope is first dipped into an anhydrous liquid in order to fill the pores of the plate, displace any gas bubbles thereon and displace or drive off any water adhering to the plate. The treated plate is subsequently dipped into a coating liquid or suspension consisting of a polymer and inert, insoluble filler particles substantially in solution. The plate is then removed and allowed to air dry, thereby forming a microporous envelope about the plate.

I have discovered that the presence of water on the battery plate can adversely affect adherence of the dip applied separator material to the battery plate. For this reason, the presence of water in the initial solvent bath is undesirable. The use of an anhydrous solvent bath as a first liquid both fills the pores of the plate and displaces any air bubbles therein to minimize the formation of undesirable pin holes as well as removes or drives off any water on the plate which can adversely affect adherence of the separator material to the plate.

Preferably, the separator is applied in a plurality of dip coating steps. The first coating liquid should be of a low viscosity to give a primary coat to the plate. After the primary coat, the plate is dipped in a second coating material having a higher viscosity than the primary coat, although a similar liquid.

In a further embodiment of my invention, the plate is subsequently dipped into a nonsolvent bath which initiates the precipitation of the polymer in the coating liquid or suspension. The plate is then air dried. More than one dip in the polymer coating suspension followed by the subsequent nonsolvent immersion and partial air drying ma be desirable in order to enhance the thickness of the separator material especially at the edges and the corners of the plate.

The advantages of my invention are as follows: separators having extremely small pores and extremely high porosity can be formed; electrodes having complex geometries can be easily enveloped with separator materials; lighter separators can be formed; the separators which are formed have lower electrical resistance; the separators formed allow a free flow of electrolyte to the active mass through the separator material; the thickness of the separator material can easily be varied; the process ca be conducted rapidly and continuously; and the separator material adheres tenaciously to the battery plate. Furthermore, depending on the material selected, the process can be conducted at room temperatures and no waste material by-products are formed.

BRIEF DESCRIPTION OF THE PREFERRED EMBODIMENTS

Figure 1:
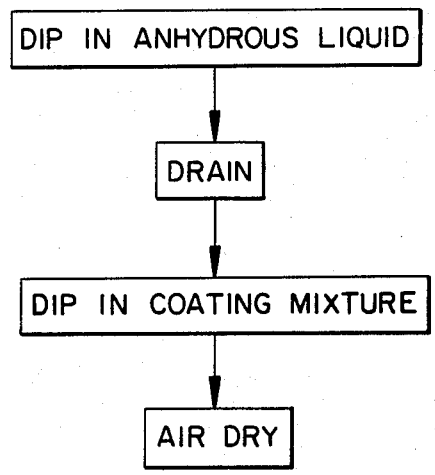
FIG. 1 is a block diagram of the preferred embodiment of the basic process of the present invention.

Although specific forms of this invention have been selected for illustration in the drawings, and the following description is drawn in specific terms for the purpose of describing the forms of the invention, this description is not intended to limit the scope of the invention which is defined in the appended claims.

An improved method for preparing an envelope of microporous battery separator material about a battery plate is taught herein. According to the present invention, the envelope may be formed in place directly on a battery plate or electrode. The preferred method is an evaporative process; although in other embodiments a solvent-nonsolvent process is used in connection with the evaporative process.

If there is any porosity in the plate, it is critical that the plate be treated to fill any pores and displace any gas therein prior to dipping of the plate into the coating solution. Additionally, if there is any residual water on the plate from the plate formation process, it is critical that the plate be treated to remove or displace any water thereon prior to dipping of the plate into the coating solution. After dipping of the plate into the coating solution, the coated plate is allowed to air dry.

The block diagram shown in FIG. 1 more completely shows the improved process of the formation of a battery separator envelope about a battery plate. A prepasted and formed, or unformed, battery plate which is to be enveloped with a separator material according to the preferred embodiment of the present invention is brought into intimate contact with a first, anhydrous liquid which displaces any gas in the pores of the plate and further removes or drives off any water adhering to the plate. I have found that the material most suitable for this first dip is an anhydrous liquid consisting of a solvent and nonsolvent. One such anhydrous solvent is anhydrous methylene chloride and one such anhydrous nonsolvent is anhydrous methanol. These are mixed in a ratio by volume identical to that in the first or primary coating suspension described herein below.

It is critical to this improved process, that the battery plate be substantially water and air bubble free prior to dipping in the coating suspension in order to obtain the best coating properties. Residual water on the battery plate will adversely affect adhesion of the polymer coating to the battery plate. Air bubbles in the pores of the plate can result in the formation of undesirable pin holes in the separator material. Residual water and air bubbles on the plate is removed or driven off by employing anhydrous materials in the first dip solution.

For the preferred dip solution consisting of anhydrous methylene chloride and anhydrous methanol, it is preferable to mix and contain the solution in a closed chamber to avoid evaporation and the consequent change in the composition of the mixture. An advantage of this particular mixture is that the materials are inexpensive, they will be not support combustion, they have low heats of evaporation, low toxicity values and are noncarcenogenic.

In the process of the present invention, the battery plates to be coated by the dip process are first immersed in a solution of anhydrous methylene chloride and anhydrous methanol. This first dip step, both drives air bubbles from the pores of the plate and displaces or removes water from the separator plate.

It may be desirable to soak the plates in this first solution to ensure that all of the gases are removed from the pores of the plates and the plate is substantially water free. Removal of the gases by such a first step substantially eliminates the formation of undesirable pin holes in the separator material of the envelope during further processing. By removing or driving off water from the plates, adhesion of the separator material to the battery plates is greatly improved.

Once the plates have been dipped in this first solution to remove gas bubbles and water, the plates are removed from the first solution and drained. Here again, this is preferably done in an environment which will not permit evaporation of the first solution, a solvent, nonsolvent solution.

The plates are then soaked in coating mixture for a sufficient time to ensure adhesion of the coating to the plate.

A solution/suspension, which will form a coating on the plate, comprises most preferably the following materials in the portions given:

| | |
|---|---|
| 800 ml. | Anhydrous methylene chloride |
| 100 ml. | Anhydrous methanol |
| 25 grams | Polycarbonate resin (Lexan 141) as produced, for example, by General Electric |
| 50 grams | Kraton G 1650 as for example, produced by Shell Chemical Co. (a terblock copolymer consisting of polystyrene and poly(ethylene-butylene) blocks to be described more fully herein after) |
| 150 grams | Dicalite WB-5 (diatomaceous earth) |

Kraton G 1650 thermo-plastic rubber is described in Shell Chemical Company technical bulletin SC: 38-80 as follows:

a three block co-polymer with polystryene in blocks and a rubbery poly(ethylene-butelene) mid block. Its typical properties are as follows:

| Typical Properties Kraton G 1650 | |
|---|---|
| Tensile properties[1] | |
| Tensile strength PSI | 5,000 |
| Elongation at break % | 500 |
| Modulus at 300% extension PSI | 800 |
| Film appearance | clear, water white |
| Solution viscosity[2] | |
| 20% by weight in toluene CPS | 1,500 |
| 25% weight and toluene CPS | 12,000 |
| Crumb size | about ¼ inch |

[1]Measured on films cast from toluene, Instron jaw separation rate of 10 inches per minute. Temperature 23° C. Dumbbell specimens cut with ASTM die C.
[2]Measured with a Brookfield model RVT viscometer.

The above ingredients are mixed in the following manner. Dissolve polycarbonate in 400 milliliters anhydrous methylene chloride. Add Kraton G and mix. While still mixing, add the anhydrous methanol slowly;

for example, over a 2 minute period. Dilute the creamy mixture with 400 milliliters anhydrous methylene chloride. Then mix in the dicalite.

I have found that this provides a coating which has a high tensile strength, just enough elasticity to accommodate plate growth, a very high oxidation resistance, excellent electrical properties particularly useful in reducing plate formation time and presents a slick outside surface to prevent separator damage. As noted above, the percentage of anhydrous methylene chloride to anhydrous methanol is, most preferably, the same as that in the first dip step.

For best results, the plate should be lowered into the dip solution at a slow uniform rate (for example, 1 inch per second) and removed at a slow uniformed rate (approximately 0.6 inches per second). This prevents air bubbles from being drawn in upon dipping and likewise prevent the coating from being stripped off upon removal of the plate from the mixture.

Once removed from the coating solution, the plates are dipped into a second coating liquid suspension which contains 375 milliliters less anhydrous methylene chloride than the primary coating solution. This second coating liquid suspension is prepared the same way as the first suspension except in the step of adding the additional 400 milliliters of anhydrous methylene chloride, add 25 milliliters instead.

The plates are then removed and permitted to dry, preferably air dry. This evaporates the solvent anhydrous methylene chloride, first to produce a gelled coating. Upon further drying, the anhydrous methanol evaporates leaving the plate enveloped in microporous separator material having all the desirable characteristics previously described.

The above described preferred process is an evaporative process rather than a solvent/nonsolvent process (even though I have used the term solvent/nonsolvent). This evaporative process is superior to a solvent/nonsolvent process which is in effect a leaching process, that is, a liquid pulling out either another liquid or a solid from a coating material. While the evaporative process is the preferred method of practicing the present invention, a solvent/nonsolvent process may be employed.

Figure 2:
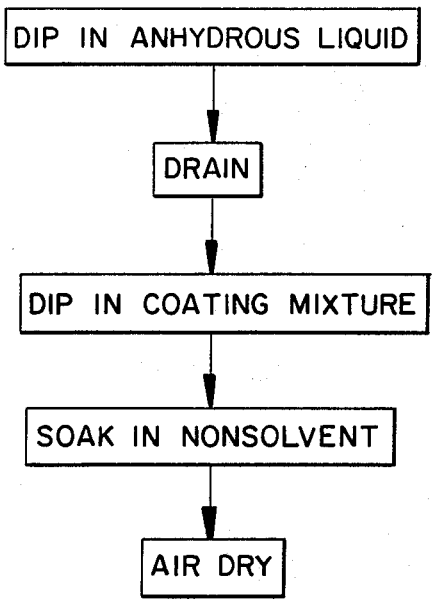
FIG. 2 is a block diagram of a modification of the basic process of the present invention showing an additional step.

Such a solvent/nonsolvent process is illustrated in FIG. 2. As shown in FIG. 2, the solvent/nonsolvent process is similar to the evaporative process disclosed in FIG. 1 and further including a step of dipping in nonsolvent following the coating dip. This additional step of dipping in a nonsolvent removes the solvent from the coating.

If desirable, to increase the thickness of the coating, an additional modification to the processes comprises adding a step or steps of redipping in a second coating mixture after the first dipping in a coating mixture. In the evaporative process (FIG. 1), this redipping (see FIG. 3) would take place after dipping in the second dip and partial air drying of the coating. It is not necessary to fully air dry and indeed it is preferred not to. After this additional dip, however, the plate would be fully air dried or dipped in a nonsolvent and then air dried.

In the solvent/nonsolvent process (FIG. 2), the redipping (see FIG. 4) in coating mixture would take place after the third dip. Here again, it would be preferable to allow partial air drying before redipping in the coating mixture. As discussed above, when the plate is inserted or withdrawn from the coating suspension, it is preferred that a uniform rate be used. The uniform rate of insertion or withdrawl helps to prevent unevenness of the coating. Any fast or jerking motions may cause the suspensions to fall to a lower portion of the plate thereby destroying the evenness of the coating.

The rate of insertion of the coated battery plate into the nonsolvent bath must be somewhat slow because the coating of the liquid polymer coating suspension on the battery electrode is fragile. By submerging the coated plate slowly, the integrity of the coating is not damaged.

Figure 3:
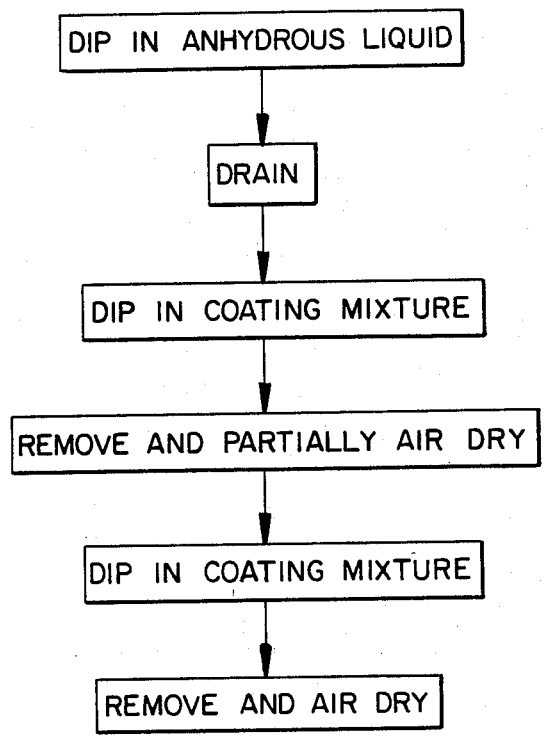
FIG. 3 is a block diagram of a preferred embodiment of the present invention.

FIG. 3 illustrates a modified air dried process as described above with respect to FIG. 1. In FIG. 3, after removal of plate from the dip coating mixture, the plate is partially air dried and then dipped in a second coating mixture before the final air drying. The primary coating suspension comprises a polymer plus a filler which has a low viscosity to coat the inner surfaces of the pores of the plate thereby enhancing adhesion of the polymer coating. This suspension is preferably a solution of anhydrous methanol and anhydrous methylene chloride. After partially air drying the plate, the plate is dipped into a second coating mixture which comprises a polymer and filler, preferably of a higher viscosity. The plate is then removed and allowed to air dry.

With the multidip process shown in FIG. 3, it is desirable for the primary coating suspension to have a lower viscosity than the second coating mixture. It has been found that two factors which affect adhesion of the separator material to the battery plate, in addition to air bubbles and water on the plate, are the texture of the plate to be coated and the viscosity of the dip coating suspension. It has been found that the rougher the plate surface, and lower the viscosity of the dip coating suspension the better the adhesion. For this reason it is desirable for the primary coating suspension to have a relatively low viscosity to provide a primer coat of separator material followed by the second coating mixture which has a higher viscosity in order to more quickly build up the separator material layered to the desired thickness.

Figure 4:
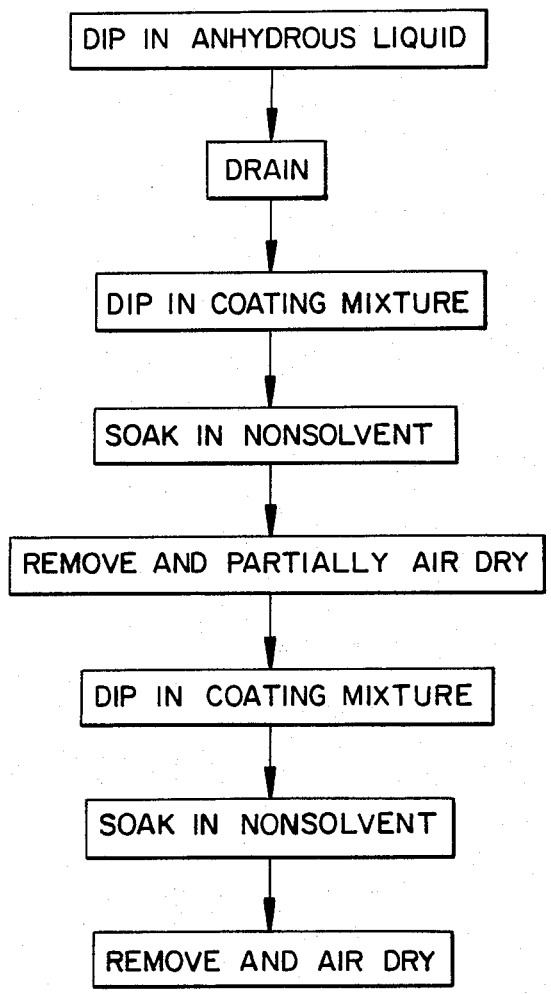
FIG. 4 is a block diagram of a further modification of the process of the present invention showing additional steps.

In an alternate embodiment shown in FIG. 4, instead of air drying after the last dip step in the polymer and filler suspension, the plate may be dipped in a nonsolvent and then removed to air dry.

The temperature of the dip coating suspension, dipping rates, and drying times effect the integrity of the formed separator. It is preferable that the process be undertaken at temperatures from about 18° C. to about 35° C. A suggested dipping schedule for 18° C. is:

(1) soak the plate or group of plates in anhydrous methylene chloride/anhydrous methanol for 60 seconds; remove and
(2) dip in a primary coating suspension by lowering into first coating mixture over a period of 2 seconds;
(3) soak in the first coating mixture for 120 seconds;
(4) remove from the first coating suspension over a period of 7 seconds;
(5) dip in a second coating suspension by lowering into the liquid over a period of 4 seconds;
(6) soak in the second coating suspension for 120 seconds;
(7) remove from the second coating suspension over a period of 7 seconds;
(8) air dry for 20 seconds;
(9) dip in the second coating suspension by lowering into the liquid over a period of 4 seconds;
(10) soak in the second coating suspension for a period of 120 seconds;

(11) remove from the second coating suspension over a period 7 seconds; and

(12) air dry until completely dry.

Such a procedure ensures that all of the polymers remain in the solution and the separator coating thickness applied to the battery plate is consistent. Dipping schedules may vary with different temperatures of coating mixtures and air.

The viscosity of the coating suspension must be low enough not to trap air bubbles, but be high enough to form at least a 0.015 inch coating in 4 or less dip steps.

The greater the alcohol content of the coating mixture, the greater the adhesion of the separator material to the plate. However, too high an alcohol content results in the formation of a nonuniformed coating.

It was found that the dip applied separator coating of the present invention adheres tenaciously to the battery plate. During normal charging, bubbles are formed at the battery plate/acid interface. However, it was found that with the dip applied separator coating of the present invention, bubbles do not form at the surface of the battery plate thereby affecting adhesion of the coating material. Instead, it was found that the bubbles do not form until they have passed through the separator material. Thus, the hydrogen gas formed in a typical lead/acid battery do not exert any pressure on the dip applied separator coating. The hydrogen stays in a dissolved state until it has passed through the coating.

It was discovered that the water on the battery plates adversely affects adhesion of the separator material to the battery plates. Water tends to cause the coating to develop cracks. The present improved process employs anhydrous solvent to displace or remove water from the battery plates thereby improving adhesion of the coating material.

It is preferable that the polymer, coating mixtures be maintained at room temperature. However, the nonsolvent bath need not be maintained at room temperature. If the temperature of the nonsolvent bath is raised above room temperature, it is believed that the precipitation of polymer from the coating mixture on the surface of the film will be enhanced.

The second contact with the nonsolvent material may simply be by dipping in a single concentration nonsolvent composition, or a more complicated process may be employed. The purpose of the nonsolvent dip step is to form the separator into the required microporous material as quickly as possible. To achieve complete precipitation of the polymer in the dip coating mixture, the nonsolvent bath may have a gradient of nonsolvent concentrations through the bath rather than a single concentration throughout. Such gradients can be achieved by using a series of individual tanks with varying concentration and temperatures in each tank or, one tank with a variable condition therealong may be possible. The use of such a nonsolvent gradient may be relevant in the terms of initial contact with the battery plates which have just been removed from the second coating mixture suspension. It is believed that if a dip coated battery separator plate is contacted initially with the strongest nonsolvent (100% nonsolvent), the pore size created by the polymer precipitation will be very small, since the strong nonsolvent concentration will cause the polymer to precipitate quickly at the outer surface of the coating. This should also produce a very tight skin on the outside of the separator coating which will prevent rapid defusion of the remaining nonsolvent into the rest of the polymer coating and thus inhibit complete precipitation of the polymer. However, having the strongest nonsolvent concentration (even 100% nonsolvent) in the last tank may be employed to provide relatively complete precipitation of the polymer from the polymer solution due to a high concentration of nonsolvent causing the precipitation of any remaining polymer in the dip coating applied mixture.

It may also be helpful to adjust the temperatures of the various tanks, or to provide a temperature gradient in a single tank in order to provide an increase in temperature as the nonsolvent concentration increases. If the temperature of the nonsolvent is initially too high, it is believed that the outer surface of the separator material will precipitate more quickly and create a tight outer skin which will slow the overall dispersion of the nonsolvent into the coating suspension, thereby inhibiting total precipitation of the polymer or even dissolving the coating due to the high solubility of polymers in the nonsolvent at high temperatures. Furthermore, an increasing temperature gradient may help to precipitate any unprecipitated polymer as the material passes from tank to tank or through a single tank having a increasing temperature gradient. Because it is desirable to achieve a separator with very small pores on the outer surface, if, after two coatings the surface pore structure is too large, it may be helpful to dip the twice coated plate into the coating suspension for a third time followed by immersion in a 100% nonsolvent solution. Such a third dip step (illustrated in the example above) and immediate contact with the 100% nonsolvent is believed to cause the polymer to precipitate quickly and produced an outer separator skin with a very tight pore structure.

When the plates are to be completely air dried (regardless of the process steps employed in formation) hot air, most preferably without oxygen, may be used to shorten drying time.

It is believed that deterioration in mechanical properties of the dip applied separator coating of the present invention occurs when the amount of filler approaches approximately 80% with respect to the total amount of polymer and filler in the polymer solution/suspension. Furthermore, it is desirable that the polymer solution/suspension contain just slightly less than that amount of polymer (with respect to the total amount of polymer and solvent) that is required to begin to gell the suspension.

The improved process of the present invention provides a battery separator envelope which is closer to the plate than in the prior art, so it is possible to enclose more plates within a standard battery container. Because the electrodes are entirely encapsulated or enveloped within a tight fitting coating, treeing across or around battery electrodes is minimized. Furthermore, the tight fit of the separator material to the battery plates substantially eliminates the need for mud wells in battery containers by preventing the material from falling off of the battery plates. The negative electrodes of a battery may be made smaller than a conventional batteries, because there is no lead lost during use of the battery due to the complete envelope of separator formed about the negative electrodes. Also, the tight envelopes strengthen the plate structure and promote faster formation. Furthermore, the close fit of the separator to the battery plate inhibits formation of lead dust. Also, when a battery becomes heavily sulfated it is believed that problems of recharging the battery decrease since none of the sulfated particles can fall away from the battery plate between the plate and the separator.

It should be understood that various changes in the details, materials and arrangements of parts which have been herein described and illustrated in order to explain the nature of this invention may be made by those skilled in the art within the principle and scope of the invention as expressed in the following claims.

I claim:

1. An improved method of enveloping a battery plate with a commercially acceptable separator material, comprising the steps of:
   a. displacing air and water from the plate by dipping in a first liquid comprising an anhydrous solvent;
   b. thereafter dipping the plate in a second liquid comprising a polymer dissolved in an anhydrous solvent/nonsolvent mixture and a filler in suspension; and then
   c. removing the plate and allowing the anhydrous solvent/nonsolvent to evaporate and form, about said plate, an envelope of microporous separator material.

2. The invention of claim 1 wherein said first liquid is anhydrous methylene chloride and anhydrous methanol.

3. The method of claim 1 in which said anhydrous solvent/nonsolvent comprises anhydrous methylene chloride and anhydrous methanol.

4. The invention of claim 1 in which the ratio of anhydrous solvent to anhydrous nonsolvent is the same in the second liquid as it is in the first liquid.

5. The invention of claim 1 in which after dipping in the second liquid, the plate is removed and dipped in an anhydrous nonsolvent and then removed and allowed to air dry to form a separator.

6. An improved dip method of enveloping a battery plate with a commercially acceptable separator material, comprising the steps of;
   a. displacing air and water from the plate by dipping a first anhydrous liquid;
   b. thereafter dipping the plate in a second liquid comprising a polymer dissolved in an anhydrous solvent/nonsolvent mixture and a filler suspension having a first viscosity; and then
   c. removing the plate and allowing it to partially dry; and
   d. thereafter dipping the plate in a third liquid comprising a polymer dissolved in an anhydrous solvent/nonsolvent mixture and a filler in suspension having a second viscosity higher than said first viscosity; and then
   e. removing the plate and allowing the anhydrous solvent/nonsolvent to evaporate and form, about said plate, an envelope of microporous separator material.

7. The invention of claim 6 wherein said first liqiud is anhydrous methylene chloride and anhydrous methanol.

8. The method of claim 6 in which said anhydrous solvent/nonsolvent comprises anhydrous methylene chloride and anhydrous methanol.

9. The invention of claim 6 in which the ratio of anhydrous solvent to anhydrous nonsolvent is the same in the second liquid as it is in the first liquid.

10. The invention of claim 6 in which after dipping in the second liquid, the plate is removed and dipped in anhydrous nonsolvent and then removed and allowed to air dry to form a separator.

11. The invention of claim 6 in which the second liqiud is prepared in the following manner:
    a. dissolving the polymer in anhydrous solvent;
    b. adding more polymer and mixing and while still mixing adding the anhydrous nonsolvent slowly; and
    c. diluting the mixture with the remainder of the anhydrous solvent and then mixing in the filler.

12. The invention of claim 11 in which the dissolved polymer in anhydrous solvent comprises dissolved polycarbonate in anhydrous methylene chloride.

13. The invention of claim 12 in which the second addition of polymer comprises the addition of Kraton G.

14. The invention of claim 11 in which the mixing takes place over approximately a two minute period.

15. The invention of claim 11 in which the dilution of the mixture is a dilution with anhydrous methylene chloride.

16. The invention of claim 11 in which the filler is dicalite.

17. The invention of claim 6 in which the first and second liquids consists essentially of the following substances in proportion to the following amounts:

| a. first liquid- |
| --- |
| anhydrous solvent/nonsolvent- |
| 800 ml. anhydrous methylene chloride |
| 100 ml. anhydrous methonal |
| b. second liquid- |
| 800 ml. anhydrous methylene chloride |
| 100 ml. anhydrous methanol |
| 75 grams polymer |
| 150 grams filler |
| c. third liquid- |
| 425 ml. anhydrous methylene chloride |
| 100 ml. anhydrous methonal |
| 75 grams polymer |
| 150 grams filler. |

18. The invention of claim 11 in which the third liquid is prepared in the same manner as the second liquid, except that less anhydrous solvent is added in step (c) so as to make a liquid which is more viscous than the second liquid.

* * * * *